(12) United States Patent
McCarty et al.

(10) Patent No.: US 9,377,961 B2
(45) Date of Patent: *Jun. 28, 2016

(54) SYSTEM AND METHOD FOR CALCULATING DATA COMPRESSION RATIO WITHOUT WRITING DATA TO MEDIA

(71) Applicant: Dell Products, LP, Round Rock, TX (US)

(72) Inventors: Ashley R. McCarty, Pflugerville, TX (US); Elizabeth A. McTeer, Austin, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/809,915

(22) Filed: Jul. 27, 2015

(65) Prior Publication Data

US 2015/0331631 A1 Nov. 19, 2015

Related U.S. Application Data

(63) Continuation of application No. 13/954,200, filed on Jul. 30, 2013, now Pat. No. 9,093,110.

(51) Int. Cl.
  *G06F 3/06* (2006.01)
  *G11B 20/10* (2006.01)
  *G11B 5/008* (2006.01)
  *G11B 20/00* (2006.01)
  *G06F 12/08* (2016.01)

(52) U.S. Cl.
  CPC ............ *G06F 3/0619* (2013.01); *G06F 3/0652* (2013.01); *G06F 3/0653* (2013.01); *G06F 3/0656* (2013.01); *G06F 3/0682* (2013.01); *G06F 12/0871* (2013.01); *G06F 12/0891* (2013.01); *G11B 5/008* (2013.01); *G11B 20/00007* (2013.01); *G11B 20/10527* (2013.01); *G06F 2212/1032* (2013.01); *G06F 2212/213* (2013.01); *G06F 2212/251* (2013.01); *G06F 2212/401* (2013.01); *G06F 2212/604* (2013.01); *G06F 2212/69* (2013.01); *G06F 2212/70* (2013.01)

(58) Field of Classification Search
  None
  See application file for complete search history.

(56) References Cited

U.S. PATENT DOCUMENTS

| 5,594,598 | A | 1/1997 | Shikakura |
| 5,671,389 | A | 9/1997 | Saliba |
| 6,614,942 | B1 | 9/2003 | Meier |
| 9,093,110 | B2 * | 7/2015 | McCarty .......... G11B 20/00007 |
| 2004/0179284 | A1 | 9/2004 | Martin |
| 2007/0041113 | A1 | 2/2007 | Mojica |
| 2007/0067483 | A1 | 3/2007 | Fallon |
| 2014/0101485 | A1 | 4/2014 | Wegener |
| 2015/0036236 | A1 | 2/2015 | McCarty et al. |

\* cited by examiner

*Primary Examiner* — Daniell L Negron
(74) *Attorney, Agent, or Firm* — Larson Newman, LLP

(57) ABSTRACT

An information handling system includes a host processor and a tape drive, which in turn includes a controller and a compression buffer. The controller is in communication with the host processor, and is configured to receive a diagnostic command from the host processor, to switch the tape drive from a normal mode to a diagnostic mode in response to the diagnostic command, and to send a compression ratio for data associated with a write command to the host processor. The compression buffer is in communication with the controller, the compression buffer configured to receive the write command, to compress data associated with the write command while in the diagnostic mode, to calculate the compression ratio for the data associated with the write command, and to delete the compressed data while the tape drive is in the diagnostic mode.

20 Claims, 5 Drawing Sheets

SYSTEM AND METHOD FOR CALCULATING DATA COMPRESSION RATIO WITHOUT WRITING DATA TO MEDIA

CROSS REFERENCE TO RELATED APPLICATIONS

This application is a continuation of U.S. patent application Ser. No. 13/954,200, entitled "System and Method for Calculating Data Compression Ratio without Writing Data to Media," filed on Jul. 30, 2013, the disclosure of which is hereby expressly incorporated by reference in its entirety.

FIELD OF THE DISCLOSURE

This disclosure generally relates to information handling systems, and more particularly relates to a system and method for calculating a data compression ratio without writing data to media.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

A user of an information handling system, which includes a tape drive, can utilize tape media for data storage. The tape drive of the information handling system can compress the data before writing the data to the tape media so that more data can be stored on the tape media. A compression ratio for the data can vary based on the type of data being compressed, which can greatly affect an amount of tape media needed to store the compressed data.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
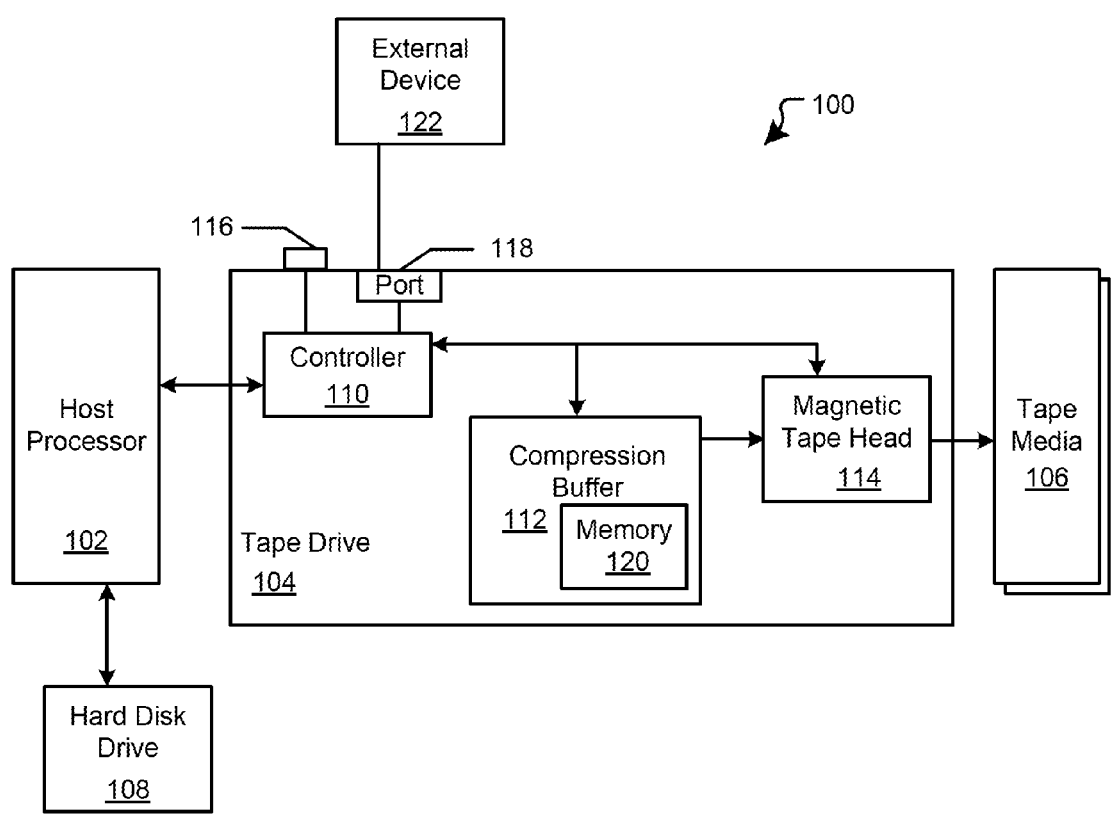
FIGS. 1-3 are block diagrams of an information handling system.
Figure 2:
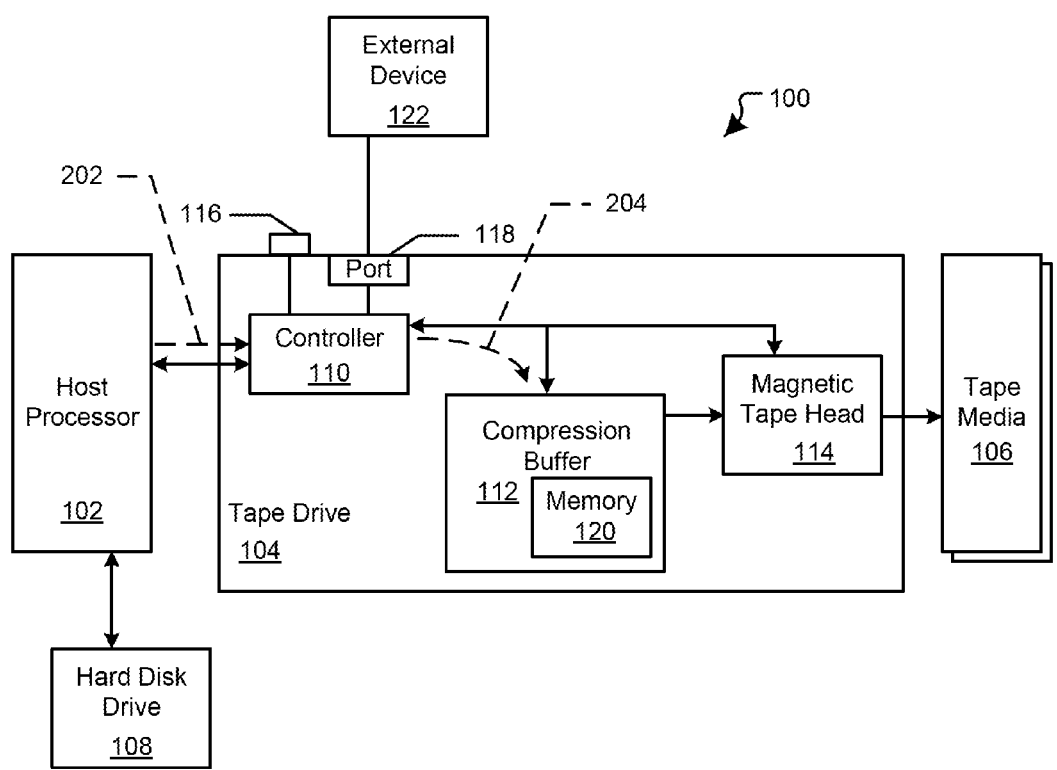
Figure 3:
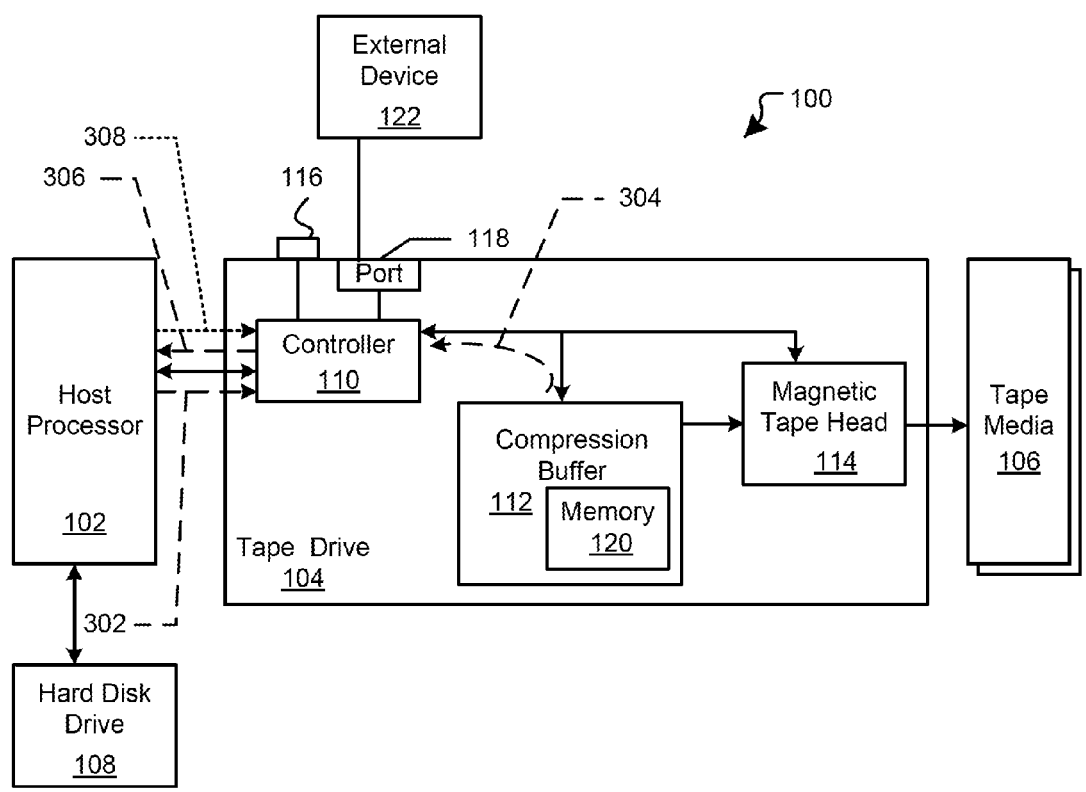

FIGS. 1-3 illustrate an information handling system 100. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

The information handling system 100 includes a host processor 102, a tape drive 104, a tape media 106, and a hard disk drive 108. In an embodiment, the host processor 102 can include a central processor unit (CPU), such as processor 502 of FIG. 5, a chipset, such as chipset 510 of FIG. 5, and an input/output (I/O) interface, such as I/O interface 530 of FIG. 5. The tape drive 104 includes a controller 110, a compression buffer 112, a magnetic tape head 114, a button 116, and a port 118. The port 118 can be a service port connected to an external device 122, such as an external disk drive, or any other type of communication port. The compression buffer 112 includes a memory 120. The host processor 102 is in communication with the controller 110 of the tape drive 104. In an embodiment, the CPU of the host processor 102 can communicate with the controller 110 of the tape drive 104 via the chipset and I/O interface of the host processor. The controller 110 is in communication with the compression buffer 112, the magnetic tape head 114, the button 116, and the port 118. The compression buffer 112 is in communication with the magnetic tape head 114, which in turn is in communication with the tape media 106. The controller 110 and the compression buffer 112 can be implemented in hardware, software, or any combination of hardware and software.

The information handling system 100 can be utilized by a user to back-up, transfer, or otherwise store data from the hard disk drive 108 to the tape media 106. The tape media 106 has a particular amount of storage capacity, such that more than one tape media may be used to store data depending on the size of the data stored in the hard disk drive 108. During a normal mode of operation, the host processor 102 can provide a write command and data to the controller 110, which in turn can provide the data to the compression buffer 112 to be compressed and then stored on the tape media 106. The compression buffer 112 can receive and compress the data associated with the write command and can buffer the compressed data in the memory 120. The memory 120 can be a non-volatile memory or the like. The compression buffer 112 can then send the compressed data from the memory 120 to the magnetic tape head 114, which in turn can write the data to one or more tape media 106. The compression buffer 112 can store all of the compressed data in the memory 120 prior to sending the compressed data to the magnetic tape head 114, can send the compressed data to the magnetic tape head in smaller portions as individual portions or blocks of the compressed data are stored in the memory, or the like. When the compression buffer 112 has completed the data compression, the compression buffer can assess an overall compression ratio for the data processed. The overall compression ratio can range depending on the type of data associated with the write command. In an embodiment, the overall compression ratio can vary from 1:1 for no compression to 2.5:1 or higher for the highest compression ratio.

In a particular embodiment, a user may want to know the size of compressed data or compression ratio associated with a particular amount of data in a data set of the hard disk drive 108 prior to writing the data to the tape media 106. In this situation, the user can utilize the size or compression ratio of the compressed data to determine an amount of storage on the tape media 106 needed for the particular amount of data in the data set to be transferred from the hard disk drive 108 to the tape media. The user can then determine a particular number of the tape media 106 needed to store the data in the data set, and how the tape media and associated hardware will be used to store all of the compressed data. In an embodiment, the information handling system 100 can determine the compression ratio for particular data written as compressed data to the tape media 106. The user can utilize the host processor 102 to request the compression ratio for the data from the compression buffer 112, and then can use the compression ratio to determine the size of the compressed data associated with particular data in a data set of the hard disk drive 108.

Referring now to FIG. 2, the host processor 102 can send a diagnostic command 202 to the controller 110, which in turn can then switch the tape drive 104 from the normal mode of operation to a diagnostic mode of operation. In another embodiment, the diagnostic command 202 can be sent to the controller from either the button 116 or the port 118. Thus, a user can place the tape drive 104 into the diagnostic mode by pressing the button 116 on the tape drive, by sending the diagnostic command 202 from the external device 122 to the controller 110 via port 118, by the host processor 102 sending the diagnostic command to the controller, or the like. When the controller receives the diagnostic command 202, the controller can cause the tape drive 104 to switch from the normal mode to the diagnostic mode.

Referring now to FIG. 3, the controller 110 can then receive a write command 302 from the host processor 102 while the tape drive 104 is in the diagnostic mode. In this situation, the compression buffer 112 can receive the data associated with the write command from the controller 110, can compress the data, and can store the compressed data in the memory 120. Depending on the embodiment, the compression buffer 112 can store all of the compressed data in the memory 120 and then delete all of the compressed data from the memory, can deleted individual blocks of the compressed data on a continuous basis as new compressed data is stored in the memory, or the like. While the compression buffer 112 is compressing the data, the compression buffer can calculate/update a compression ratio for the data associated with the write command 302.

When the compression buffer 112 completes the compression of all of the data associated with the write command 302, the compression buffer can automatically send the overall compression ratio for the data to the controller 110 via a signal 304. The controller 110 can then automatically send the compression ratio to the host processor 102 via a signal 306. A user can receive the compression ratio from the host processor 102 via the host processor outputting the compression ratio on a display of the information handling system 100. The information handling system 100 can also store the compression ratio in a memory of the information handling system for later access by the user. In an embodiment, after sending the compression ratio to the host processor 102, the controller 110 can switch the tape drive 104 from the diagnostic mode back to the normal mode. If a new write command is sent to the compression buffer 112 before a new diagnostic command is sent to the controller 110, the compression buffer can perform the data compression on the data associated with the write command and can then send the compressed data to the magnetic tape head 114 to write to the tape media 106.

In another embodiment, the tape drive 104 can remain in the diagnostic mode until the host processor 102 or other source sends a normal mode signal 308 to the controller 110. The controller 110 can then switch the tape drive 104 from the diagnostic mode to the normal mode in response to receiving the normal mode signal 308. If a new write command is sent to the controller 110 while the tape drive 104 is still in the diagnostic mode, the compression buffer 112 can perform the data compression on the data associated with the write command, can determine a compression ratio for the data, can send the compression ratio to the controller, and can then delete the compressed data without sending the compressed data to the magnetic tape head 114. Thus, during the diagnostic mode, the compression buffer 112 compresses the data associated with the write command, calculates a compression ratio for the data, and sends the compression ratio to the host processor 102 without storing the compressed data in the tape media 106. However, during the normal mode, the compression buffer 112 compresses the data associated with the write command, calculates the compression ratio for the data, sends the compressed data to the magnetic tape head 114 to be written to the tape media 106, and then sends the compression ratio to the host processor 102.

During the normal mode of operation, the writing of the compressed data to the tape media 106 is the most time consuming operation of storing the data on the tape media. Also, if the user does not know the compression ratio for the data associated with the write command prior to the write command being executed by the tape drive 104, the amount of storage on the tape media 106 can be either less than or more than the needed amount for the data associated with the write command. Thus, the user may have purchased more tape media 106 than needed or may have expended the time and tape media 106 to store compressed data to the tape media without having enough storage. Therefore, a user can save time and possible the expense of buying too many tape media 106 by the information handling system 100 determining a compression ratio for particular data in the memory 108 to be stored on the tape media 106 while the tape drive 104 is in the diagnostic mode.

Figure 4:
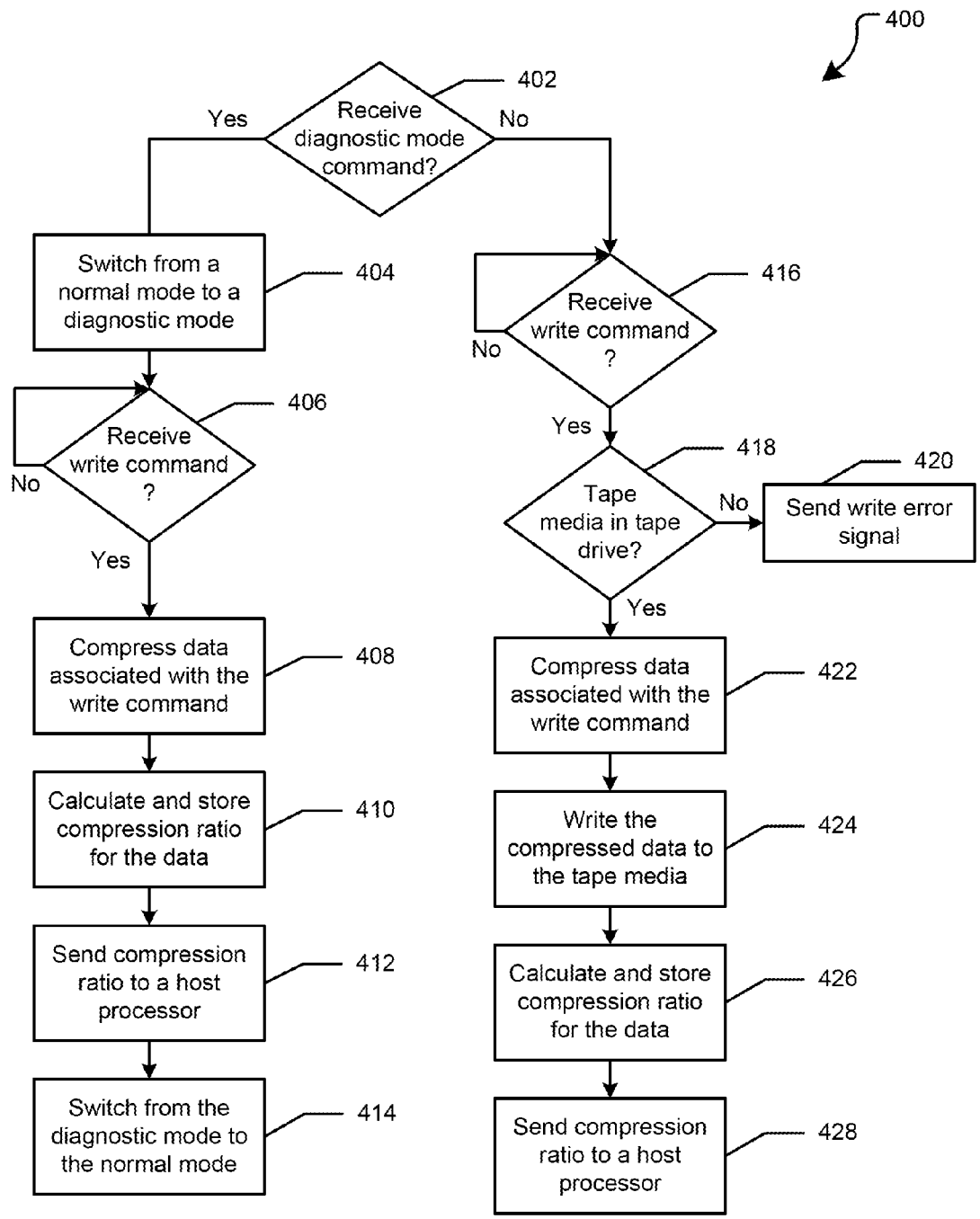
FIG. 4 is a flow diagram of a method to determining a compression ratio of data associated with a write command.

FIG. 4 shows a flow diagram of a method 400 for determining a compression ratio of data associated with a write command. At block 402, a determination is made whether a diagnostic command is received. In an embodiment, the diagnostic command can be received from a host processor, from a button on a tape drive, from an external device via a service port of the tape drive, or the like. If the diagnostic command is received, the tape drive is switched from a normal mode to a diagnostic mode at block 404. At block 406, a determination is made whether a write command is received. The write command can come from the host processor and can be substantially the same type of write command as received during a normal mode of the tape drive.

At block 408, data associated with the write command is compressed. The compression ratio is calculated and stored at block 410. At block 412, the compression ratio is sent to the host processor. In diagnostic mode, the compression ratio can be automatically sent to the host processor upon the completion of compressing all of the data associated with the write command. The tape drive is switched from diagnostic mode to the normal mode at block 414. In another embodiment, the tape drive can remain in the diagnostic mode until a normal mode signal is received. The tape drive can then be switched from the diagnostic mode to the normal mode in response to receiving the normal mode signal.

If the diagnostic command is not received, a determination is made whether a write command is received at block 416. At block 418, a determination is made whether tape media is in the tape drive. If the tape media is not the tape drive, an error signal is sent to the host processor at block 420. At block 422, if the tape media is in the tape drive, data associated with the write command is compressed. In an embodiment, the data is compressed in a compression buffer of the tape drive. At block 424, the compressed data is written to the tape media. The data can be written by a magnetic tape head of the tape drive. A compression ratio for the compressed data is calculated and stored at block 426. The compression ratio for the data can be based on different compression ratios for different types of data in the data associated with the write command. At block 428, the compression ratio is sent to the host processor via the controller of the tape drive.

Figure 5:
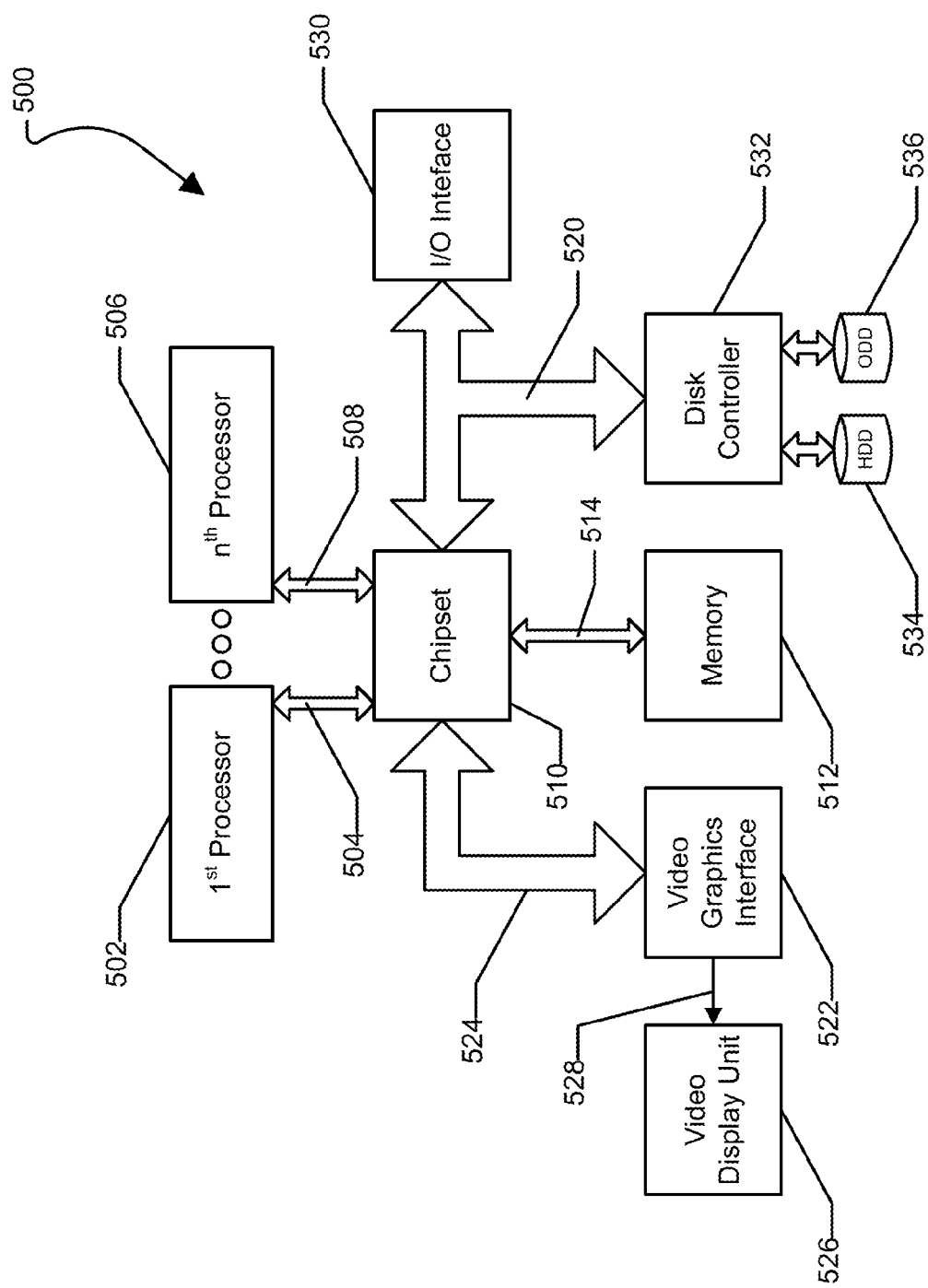
FIG. 5 is a block diagram of a general information handling system.

As shown in FIG. 5, an information handling system 500, such as information handling system 100, can include a first physical processor 502 coupled to a first host bus 504 and can further include additional processors generally designated as $n^{th}$ physical processor 506 coupled to a second host bus 508. The first physical processor 502 can be coupled to a chipset 510 via the first host bus 504. Further, the $n^{th}$ physical processor 506 can be coupled to the chipset 510 via the second host bus 508. The chipset 510 can support multiple processors and can allow for simultaneous processing of multiple processors and support the exchange of information within information handling system 500 during multiple processing operations.

According to one aspect, the chipset 510 can be referred to as a memory hub or a memory controller. For example, the chipset 510 can include an Accelerated Hub Architecture (AHA) that uses a dedicated bus to transfer data between first physical processor 502 and the $n^{th}$ physical processor 506. For example, the chipset 510, including an AHA enabled-chipset, can include a memory controller hub and an input/output (I/O) controller hub. As a memory controller hub, the chipset 510 can function to provide access to first physical processor 502 using first bus 504 and $n^{th}$ physical processor 506 using the second host bus 508. The chipset 510 can also provide a memory interface for accessing memory 512 using a memory bus 514. In a particular embodiment, the buses 504, 508, and 514 can be individual buses or part of the same bus.

The chipset 510 can also provide bus control and can handle transfers between the buses 504, 508, and 514.

According to another aspect, the chipset 510 can be generally considered an application specific chipset that provides connectivity to various buses, and integrates other system functions. For example, the chipset 510 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel® Corporation of Santa Clara, Calif., can provide at least a portion of the chipset 510. The chipset 510 can also be packaged as an application specific integrated circuit (ASIC).

The information handling system 500 can also include a video graphics interface 522 that can be coupled to the chipset 510 using a third host bus 524. In one form, the video graphics interface 522 can be an Accelerated Graphics Port (AGP) interface to display content within a video display unit 526. Other graphics interfaces may also be used. The video graphics interface 522 can provide a video display output 528 to the video display unit 526. The video display unit 526 can include one or more types of video displays such as a flat panel display (FPD) or other type of display device.

The information handling system 500 can also include an I/O interface 530 that can be connected via an I/O bus 520 to the chipset 510. The I/O interface 530 and I/O bus 520 can include industry standard buses or proprietary buses and respective interfaces or controllers. For example, the I/O bus 520 can also include a Peripheral Component Interconnect (PCI) bus or a high speed PCI-Express bus. In one embodiment, a PCI bus can be operated at approximately 56 MHz and a PCI-Express bus can be operated at more than one speed, such as 2.5 GHz and 4 GHz. PCI buses and PCI-Express buses can be provided to comply with industry standards for connecting and communicating between various PCI-enabled hardware devices. Other buses can also be provided in association with, or independent of, the I/O bus 520 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 510 can be a chipset employing a Northbridge/Southbridge chipset configuration (not illustrated). For example, a Northbridge portion of the chipset 510 can communicate with the first physical processor 502 and can control interaction with the memory 512, the I/O bus 520 that can be operable as a PCI bus, and activities for the video graphics interface 522. The Northbridge portion can also communicate with the first physical processor 502 using first bus 504 and the second bus 508 coupled to the $n^{th}$ physical processor 506. The chipset 510 can also include a Southbridge portion (not illustrated) of the chipset 510 and can handle I/O functions of the chipset 510. The Southbridge portion can manage the basic forms of I/O such as Universal Serial Bus (USB), serial I/O, audio outputs, Integrated Drive Electronics (IDE), and ISA I/O for the information handling system 500.

The information handling system 500 can further include a disk controller 532 coupled to the I/O bus 520, and connecting one or more internal disk drives such as a hard disk drive (HDD) 534 and an optical disk drive (ODD) 536 such as a Read/Write Compact Disk (R/W CD), a Read/Write Digital Video Disk (R/W DVD), a Read/Write mini-Digital Video Disk (R/W mini-DVD), or other type of optical disk drive, such as an external disk drive system.

Although only a few exemplary embodiments have been described in detail in the exemplary embodiments without materially departing from the novel teachings and advantages of the embodiments of the present disclosure. For example, the methods described in the present disclosure can be stored as instructions in a computer readable medium to cause a processor, such as chipset 510, to perform the method. Additionally, the methods described in the present disclosure can be stored as instructions in a non-transitory computer readable medium, such as a hard disk drive, a solid state drive, a flash memory, and the like. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a host processor; and
   a tape drive configured to communicate with the host processor, the tape drive including:
      a compression buffer that, while the tape drive is in a diagnostic mode, receives a write command, compresses data associated with the write command, calculates a compression ratio for the data, and deletes the compressed data; and
      a controller that communicates with the compression buffer and with the host processor, and sends the compression ratio to the host processor.

2. The information handling system of claim 1, wherein the tape drive further includes:
   a magnetic tape head in communication with the compression buffer, wherein the magnetic tape head receives the compressed data from the compression buffer, and writes the compressed data to tape media while the tape drive is in a normal mode.

3. The information handling system of claim 2, wherein the compression buffer does not send the compressed data to the magnetic tape head white the tape drive is in the diagnostic mode.

4. The information handling system of claim 2, wherein the controller further receives the compression ratio from the compression buffer after the magnetic tape head writes the compressed data to the tape, and sends the compression ratio to the host processor.

5. The information handling system of claim 1, wherein the controller further receives the compression ratio from the compression buffer before the compressed data is deleted while the tape drive is in the diagnostic mode, and sends the compression ratio to the host processor.

6. The information handling system of claim 1, wherein controller receives the diagnostic command from the host processor.

7. The information handling system of claim 1, wherein the tape drive further includes:
   a button in communication with the controller, wherein the button sends the diagnostic command to the controller in response to the button being pressed.

8. A method comprising:
   determining whether a diagnostic command has been received; and
   in response to the diagnostic command being received:
      receiving, at a compression buffer of a tape drive, a write command;
      compressing, by the compression buffer, first data associated with the first write command;
      calculating, by the compression buffer, a compression ratio for the first data;
      deleting, by the first compression buffer, the compressed data; and
      sending, by a controller of the tape drive, the compression ratio to a host processor.

9. The method of claim 8, further comprising:
   in response to the diagnostic command not being received:
      receiving a second write command;
      determining that a tape media is in the tape drive;
      compressing second data associated with the second write command; and
      writing the second compressed data to the tape media.

10. The method of claim 9, wherein writing the second compressed data is performed by a magnetic tape head of the tape drive.

11. The method of claim 8, further comprising:
   deleting the first compressed data from the compression buffer without writing the first compressed data to a tape media.

12. The method of claim 8, wherein the diagnostic command is received from the host processor.

13. The method of claim 12, wherein the diagnostic command is received in response to a button of the tape drive being pressed.

14. A non-transitory computer-readable medium including code for to cause a processor to perform a method, the method comprising:
   determining whether a diagnostic command has been received; and
   in response to the diagnostic command being received:
      receiving, at a compression buffer of a tape drive, a write command;
      compressing, by the compression buffer, first data associated with the first write command;
      calculating, by the compression buffer, a compression ratio for the first data;
      deleting, by the first compression buffer, the compressed data; and
      sending, by a controller of the tape drive, the compression ratio to a host processor.

15. The computer-readable medium of claim 14, the method further comprising:
   switching, by the controller, the tape drive from a diagnostic mode to a normal mode in response to sending the compression ratio.

16. The computer-readable medium of claim 15, wherein the compression buffer does not send the compressed data to a magnetic tape head while the tape drive is in the diagnostic mode.

17. The computer-readable medium of claim 14, wherein the compression ratio for the data is based on different compression ratios for different types of sub-data in the data.

18. The computer-readable medium of claim 14, wherein the diagnostic command is received from the host processor.

19. The computer-readable medium of claim 14, wherein the diagnostic command is received in response to a button of the tape drive being pressed.

20. The computer-readable medium of claim 14, the method further comprising:
   in response to the diagnostic command not being received:
      receiving a second write command;
      determining that a tape media is in the tape drive;
      compressing second data associated with the second write command; and
      writing the second compressed data to the tape media.

* * * * *